(12) United States Patent
Watanabe et al.

(10) Patent No.: US 6,991,861 B2
(45) Date of Patent: Jan. 31, 2006

(54) MAGNETIC RECORDING MEDIUM

(75) Inventors: Akiko Watanabe, Miyagi (JP);
Katsunori Maeshima, Miyagi (JP);
Tomoo Fukuda, Miyagi (JP); Noboru Sekiguchi, Miyagi (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 10/863,714

(22) Filed: Jun. 8, 2004

(65) Prior Publication Data

US 2004/0253483 A1    Dec. 16, 2004

(30) Foreign Application Priority Data

Jun. 10, 2003  (JP) ............................ P2003-164729

(51) Int. Cl.
*G11B 5/706* (2006.01)

(52) U.S. Cl. ............................... 428/840; 428/840.6

(58) Field of Classification Search ........ 428/694 BM, 428/336, 694 BA, 840.6, 840
See application file for complete search history.

(56) References Cited

U.S. PATENT DOCUMENTS 6,203,934 B1 * 3/2001 Naoe et al. ............. 428/694 B 6,689,456 B2 * 2/2004 Nakazawa et al. .......... 428/332

FOREIGN PATENT DOCUMENTS

JP  60-021307  *  2/1985
JP  60-147929  *  8/1985

* cited by examiner

*Primary Examiner*—Stevan A. Resan
(74) *Attorney, Agent, or Firm*—Sonnenschein, Nath & Rosenthal LLP

(57) ABSTRACT

The coating-type magnetic recording medium has a non-magnetic layer mainly composed of a non-magnetic powder and binder, and a magnetic layer mainly composed of a ferromagnetic powder and a binder, which are stacked in this order on a non-magnetic substrate, wherein dispersion $\sigma L/L$ of long-axis length of all ferromagnetic powder particles contained in the magnetic layer falls in a range of $\sigma L/L \leq \pm 10\%$, where L is an average long-axis length and $\sigma L$ is a standard deviation thereof, and dispersion $\sigma W/W$ of short-axis length of all ferromagnetic powders contained in the magnetic layer falls in a range of $\sigma W/W \leq \pm 15\%$, where W is an average short-axis length and $\sigma W$ is a standard deviation thereof. The average long-axis length L is typically adjusted within the range of 0.08 $\mu$m and 0.12 $\mu$m, and the Switching Field Distribution (SFD) of the medium is adjusted to 0.25 or less.

4 Claims, No Drawings

MAGNETIC RECORDING MEDIUM

CROSS REFERENCE TO RELATED APPLICATIONS

The present document is based on Japanese Priority Document JP2003-164729, filed in the Japanese Patent Office on Jun. 10, 2003, the entire contents of which being incorporated herein by reference.

BACKGROUND OF THE INVENTION

1. Field of the Invention

The present invention relates to a magnetic recording medium such as magnetic tape, and in particular to a magnetic recording medium preferable in electromagnetic conversion characteristics.

2. Description of Related Art

Magnetic recording medium has widely been used as an external storage media for audio components, video recorders, computers and so forth. With recent advances in shorter recording wavelength, higher density and larger capacity of recording/reproducing devices, there has been large growing demands for improvement in electromagnetic conversion characteristics of coating-type magnetic recording medium, so that efforts have been made on obtaining thinner magnetic layer, higher filling factor and finer grain size of magnetic powder, and smoother surface.

A magnetic recording medium having an improved electromagnetic conversion characteristics is typically proposed in the Patent Document 1. (Patent Document 1: Japanese Patent Application Publication No. 2000-231713)

The coating-type magnetic recording medium, however, suffers from a problem that, for the purpose of obtaining a practically-satisfactory durability, the magnetic layer of which must be added with materials which are not essential for recording, such as lubricant and abrasive, beside binder, and this results in further lowering in the filling factor and in the output.

One possible method of increasing the recording density is to reduce grain size of ferromagnetic powder. Excessive size reduction, however, results in difficulty in dispersion of the magnetic coating, and in lowered output. The poor dispersion also worsens the surface property, increases noise, and degrades the electromagnetic conversion characteristics, all of which remain to be addressed.

It is therefore a subject of the present invention to provide a coating-type magnetic recording medium having preferable electromagnetic conversion characteristics suitable for high-density recording.

SUMMARY OF THE INVENTION

The present inventors found out facts as described below. That is, in a multilayer-coating-type magnetic recording medium, dispersion $\sigma L/L$ of long-axis length of all ferromagnetic powder particles contained in a magnetic layer, where L is an average long-axis length and $\sigma L$ is a standard deviation thereof, and dispersion $\sigma W/W$ of short-axis length of all ferromagnetic powder particles contained in a magnetic layer, where W is an average short-axis length and $\sigma W$ is a standard deviation thereof, can affect a Switching Field Distribution (SFD) of the magnetic recording medium.

Any variation in the coercive force will worsen the electromagnetic conversion characteristics in particular in recent trends in higher recording density and shorter recording wavelength.

It is also known that thickness of the magnetic layer larger than, for example, ¼ of recording wavelength will result in noise generation, under circumstances of high recording density and short recording wavelength.

A magnetic recording medium of the present invention, aimed at obtaining high electromagnetic conversion characteristics, is a multilayer-coating-type magnetic recording medium having a non-magnetic layer mainly composed of a non-magnetic powder and binder, and a magnetic layer mainly composed of a ferromagnetic powder and a binder, which are stacked in this order on a non-magnetic substrate, wherein dispersion $\sigma L/L$ of long-axis length of all ferromagnetic powder particles contained in the magnetic layer falls in a range of $\sigma L/L \leq \pm 10\%$, where L is an average long-axis length and $\sigma L$ is a standard deviation thereof, and dispersion $\sigma W/W$ of short-axis length of all ferromagnetic powders contained in the magnetic layer falls in a range of $\sigma W/W \leq \pm 15\%$, where W is an average short-axis length and $\sigma W$ is a standard deviation thereof.

The magnetic recording medium is also characterized in having the average long-axis length L of the ferromagnetic powder particles falls in a range of 0.08 $\mu$m and 0.12 $\mu$m, both ends inclusive, and in having a Switching Field Distribution (SFD) of 0.25 or less when fabricated using the ferromagnetic powder.

The magnetic recording medium is also characterized in having the average long-axis length L of the ferromagnetic powder particles falls in a range of 0.06 $\mu$m and 0.08 $\mu$m, only the lower end inclusive, and in having a Switching Field Distribution (SFD) of 0.30 or less when fabricated using the ferromagnetic powder.

The magnetic recording medium is still also characterized in having the average long-axis length L of the ferromagnetic powder particles falls in a range of 0.02 $\mu$m and 0.06 $\mu$m, only the lower end inclusive, and in having a Switching Field Distribution (SFD) of 0.40 or less when fabricated using the ferromagnetic powder.

The magnetic recording medium is still also characterized in having a thickness of the magnetic layer of 0.2 $\mu$m or less.

All of these features ensure large electromagnetic conversion characteristics.

The non-magnetic substrate; magnetic powder and binder mixed into the magnetic layer; inorganic powder, binder and optionally added dispersant, abrasive, antistatic agent and rust-proofing agent mixed into the non-recording layer; and solvent used for preparing magnetic dispersion liquid or non-recording-layer-forming dispersion liquid may be any publicly-known materials and are not specifically limited at all.

For example, materials for composing the non-magnetic substrate may be any of those generally applied to this sort of magnetic recording medium, and examples of which include polyesters such as polyethylene terephthalate and polyethylene naphthalate; polyolefins such as polyethylene and polypropylene; cellulose derivatives such as cellulose triacetate, cellulose diacetate and cellulose acetate butylate; vinyl resins such as polyvinyl chloride and polyvinylidene chloride; plastics such as polycarbonate, polyimide, polyamide, polyamideimide; paper; metals such as aluminum and copper; light metal alloy such as aluminum alloy and titanium alloy; ceramics; and single crystal silicon.

A form of the non-magnetic substrate may be any of those selected from a film, tape, sheet, disk, card and drum.

As the magnetic powder, ferromagnetic iron oxide particle, ferromagnetic chromium dioxide, ferromagnetic alloy powder and iron nitride may be included.

The inorganic powder used for the non-recording layer magnetic may be any of publicly known ones, and examples of which include silica, titanium oxide, alumina, carbon black, □-iron oxide and calcium carbonate. These pigments may have a needle form.

Materials for composing the binder include vinyl chloridevinyl acetate copolymer, vinyl chloride-vinyl acetate-vinyl alcohol copolymer, vinyl chloride-vinyl acetate-maleic acid copolymer, vinyl chloride-vinylidene chloride copolymer, vinyl chloride-acrylonitrile copolymer, acrylate ester-acrylonitrile copolymer, acrylate ester-vinylidene chloride copolymer, methacrylic acid-vinylidene chloride copolymer, methacrylate ester-styrene copolymer, thermoplastic polyurethane resin, phenoxy resin, polyvinyl fluoride, vinylidene chloride-acrylonitrile copolymer, butadiene-acrylonitrile copolymer, acrylonitrile-butadiene-methacrylic acid copolymer, polyvinyl butyral, cellulose derivatives, styrene-butadiene copolymer, polyester resin, phenol resin, epoxy resin, thermosetting polyurethane resin, urea resin, melamine resin, alkyd resin, urea-formaldehyde resin and any mixtures of these materials.

Among others, polyurethane resin, polyester resin and acrylonitrile-butadiene copolymer are preferred in view of ensuring flexibility, and cellulose derivatives, phenol resin and epoxy resin are preferred in view of ensuring rigidity. These materials may be improved in the durability by using isocyanate compound as a crosslinking agent.

The solvent for preparing the magnetic dispersion liquid include ketone solvents such as acetone, methyl ethyl ketone, methyl isobutyl ketone and cyclohexanone; ester solvents such as methyl acetate, ethyl acetate, butyl acetate, ethyl lactate and glycol acetate monoethyl ester; glycol ether solvents such as glycol monoethyl ether and dioxane; aromatic hydrocarbon solvents such as benzene, toluene and xylene; and organochlorine compounds solvents such as methylene chloride, ethylene chloride, carbon tetrachloride, chloroform, ethylene chlorohydrin and dichlorobenzene.

It is also allowable to dispose a backcoat layer, if necessary, on the opposite surface of the non-magnetic substrate, which is the surface having nonmagnetic layer formed thereon.

DETAILED DESCRIPTION OF THE PREFERRED EMBODIMENTS

The following paragraphs will further detail the present invention with reference to exemplary embodiments which by no means limit the present invention.

Exemplary Embodiments

Preparation of Sample Tape

First, compositions listed in Tables 1 to 4 are kneaded using a kneader, the product is diluted with methyl ethyl ketone, toluene and cyclohexanone, dispersed in a sand mill, to thereby obtain a magnetic coating material. It is to be noted that "part" described in Table 1 means "part by weight".

TABLE 1

Composition of Magnetic Coating

| | |
|---|---|
| Ferromagnetic powder | 100 parts |
| Vinyl chloride-base copolymer resin (average degree of polymerization = 300) | 10 parts |
| Polyurethane resin (weight average molecular weight = 41,200) | 7 parts |
| Abrasive: $Al_2O_3$ fine particle (grain size = 200 nm, specific surface area (BET method) = 11.1 $m^2/g$) | 10 parts |
| Stearic acid | 1 part |
| Butyl stearate | 2 parts |
| Methyl ethyl ketone | 20 parts |
| Toluene | 20 parts |
| Cyclohexanone | 10 parts |

TABLE 2

Exemplary Embodiments and Comparative Examples

| Ferromagnetic powder Type | | Average long-axis length [nm] | Average short-axis length [nm] | Amount of magnetization of powder [$Am^2$/kg] | Coercive force of powder [kA/m] |
|---|---|---|---|---|---|
| A | Fe-base metal | 121 | 13 | 134 | 224 |
| B | Fe-base metal | 102 | 12 | 135 | 221 |
| C | Fe-base metal | 81 | 12 | 134 | 223 |
| D | Fe-base metal | 81 | 11 | 134 | 221 |
| E | Fe-base metal | 80 | 11 | 133 | 220 |
| F | Fe-base metal | 80 | 11 | 132 | 222 |

TABLE 3

Exemplary Embodiments and Comparative Examples

| Ferromagnetic powder Type | | Average long-axis length [nm] | Average short-axis length [nm] | Amount of magnetization of powder [$Am^2$/kg] | Coercive force of powder [kA/m] |
|---|---|---|---|---|---|
| G | Fe-base metal | 71 | 11 | 130 | 220 |
| H | Fe-base metal | 60 | 11 | 131 | 221 |
| I | Fe-base metal | 61 | 11 | 130 | 218 |
| J | Fe-base metal | 59 | 10 | 129 | 219 |
| K | Fe-base metal | 60 | 10 | 129 | 219 |
| L | Fe-base metal | 49 | 10 | 130 | 219 |

TABLE 4

Exemplary Embodiments and Comparative Examples

| Ferromagnetic powder Type | | Average long-axis length [nm] | Average short-axis length [nm] | Amount of magnetization of powder [$Am^2$/kg] | Coercive force of powder [kA/m] |
|---|---|---|---|---|---|
| M | Fe-base metal | 41 | 11 | 128 | 213 |
| N | Fe-base metal | 39 | 10 | 127 | 210 |
| O | Fe-base metal | 40 | 10 | 127 | 212 |
| P | Fe-base metal | 41 | 11 | 128 | 212 |
| Q | Fe-base metal | 31 | 10 | 126 | 210 |

Next, compositions listed in Table 5 is kneaded using a kneader, the product is diluted with methyl ethyl ketone, toluene and cyclohexanone, dispersed by a sand mill, to thereby obtain a non-magnetic coating material. It is to be noted that "part" described in Table 5 means "part by weight".

TABLE 5

| Composition of Non-Magnetic Coating | |
| --- | --- |
| α-Iron oxide (specific surface area = 53 m²/g, long-axis length = 0.15 μm, needle shape ratio = 7) | 100 parts |
| Vinyl chloride-base copolymer resin (average degree of polymerization = 300) | 10 parts |
| Polyurethane resin (weight average molecular weight = 41,200) | 7 parts |
| Citric acid (molecular weight: 192.1) | 2 part |
| Butyl stearate | 1 parts |
| Methyl ethyl ketone | 70 parts |
| Toluene | 70 parts |
| Cyclohexanone | 40 parts |

The magnetic coating material and non-magnetic coating material were individually added with 3 parts by weight of polyisocyanate (Coronate L, product of Nippon Polyurethane Industry Co., Ltd.), and then coated on a PET (polyethylene terephthalate) film in an order of the non-magnetic coating material and magnetic coating material. The coated materials were subjected to longitudinal orientation treatment before being completely dried. After drying, the coated film was smoothened by calendering, and a magnetic layer was formed to a thickness listed in Table 7 to thereby fabricate the sample tape. A composition of a backcoat-layer-forming dispersion liquid is as shown in Table 6, below.

TABLE 6

| Composition of Backcoat-Layer-Forming Dispersion Liquid | |
| --- | --- |
| Carbon black (grain size = 40 nm, DBP oil absorption = 112.0 ml/100 g) | 100 parts |
| Polyester-base polyurethane resin (weight average molecular weight = 71,200) | 13 parts |
| Phenoxy resin (average degree of polymerization = 100) | 43 parts |
| Nitrocellulose resin (average degree of polymerization = 90) | 10 parts |
| Methyl ethyl ketone | 500 parts |
| Toluene | 500 parts |

Thus-obtained wide tape was slit to obtain an 8-mm-wide sample tape.

The magnetic recording tapes fabricated according to the compositions listed in the Tables were measured for their grain size distribution, magnetic characteristics, short-wavelength output, C/N characteristics and long-wavelength output characteristics. Methods for the individual measurements are as described below.

[Particle Size Distribution Measurement]

Particles of the individual ferromagnetic powders were photographed under a transmission electron microscope (JEM-200CX, product of JEOL), the long-axis length and short-axis length of 100 particles (n=100) of the individual samples were measured under an optical microscope with a ruler, and average long-axis length was defined as L, standard deviation thereof as σL, average short-axis length as W, and standard deviation thereof as σW.

[Magnetic Characteristics]

The individual tapes were measured for square ratio (Rs) and the Switching Field Distribution (SFD) using a vibrating sample magnetometer (VSM-P7-15, product of Toei Industry Co., Ltd) under a maximum applied magnetic field of 1.5 T. The samples were 6.25-mm wide and 32-mm long tapes.

[Electromagnetic Conversion Measurement]

The individual tapes were recorded with 195-kfci signal using a drum tester equipped with a recording head (MIG: metal in gap, gap=0.15 μm), and the reproduced output and noise were measured using a spectrum analyzer. A reproduction head used herein was an MR head (magneto-resistance head). A level of frequency component found at ±2 MHz of the reproduced signal is defined as a noise level, and a reproduction signal output ratio of the noise output was defined as C/N characteristic. Reference tapes used herein were that of Comparative Example 3 for the sample tapes of which ferromagnetic powder has an average long-axis length L of 0.08 μm to 0.12 μm, both ends inclusive, that of Comparative Example 7 for the sample tapes with L of 0.06 μm to 0.08 μm, only the lower end inclusive, and that of Comparative Example 10 for the sample tapes with L of 0.02 μm to 0.06 μm, only the lower end inclusive. Values obtained from the individual tapes, while assuming a value of the reference tapes as 0.0 [dB], were listed in Table 7.

TABLE 7

| | | | Results | | | | | |
| --- | --- | --- | --- | --- | --- | --- | --- | --- |
| | Types of | | Dispersion of long-axis length | Dispersion of short-axis length | Magnetic characteristics | | Electro-magnetic conversion characteristics | |
| | ferromagnetic powder | Thickness [μm] | (σL/L) [%] | (σW/W) [%] | Rs [%] | SFD | Output [dB] | C/N [dB] |
| Exemplary Embodiment 1 | A | 0.2 | 9.2 | 11.6 | 92.4 | 0.23 | 0.2 | 0.7 |
| Exemplary Embodiment 2 | B | 0.2 | 8.6 | 12 | 91.9 | 0.234 | 0.2 | 0.8 |
| Comparative Example 1 | C | 0.2 | 11.8 | 18.6 | 88.1 | 0.345 | 0.1 | −1 |
| Comparative Example 2 | D | 0.2 | 11.2 | 12.8 | 89.2 | 0.294 | 0.1 | −0.5 |
| Comparative Example 3 | E | 0.2 | 8.4 | 17.6 | 90.5 | 0.276 | 0 | 0 |
| Exemplary Embodiment 3 | F | 0.2 | 7.9 | 13.4 | 92.3 | 0.232 | 0.2 | 0.9 |

TABLE 7-continued

|  | Types of ferromagnetic powder | Thickness [μm] | Results | | | | | | |
|---|---|---|---|---|---|---|---|---|---|
|  |  |  | Dispersion of long-axis length (σL/L) [%] | Dispersion of short-axis length (σW/W) [%] | Magnetic characteristics | | Electromagnetic conversion characteristics | | |
|  |  |  |  |  | Rs [%] | SFD | Output [dB] | C/N [dB] | |
| Comparative Example 4 | F | 0.25 | 7.9 | 13.4 | 91 | 0.242 | −1 | −0.5 | |
| Exemplary Embodiment 4 | F | 0.1 | 7.9 | 13.4 | 90.2 | 0.23 | 0.5 | 1.1 | |
| Exemplary Embodiment 5 | F | 0.05 | 7.9 | 13.4 | 89.5 | 0.246 | 1 | 1.5 | |
| Exemplary Embodiment 6 | G | 0.2 | 8.5 | 12.8 | 92.3 | 0.265 | 0.2 | 0.5 | |
| Comparative Example 5 | H | 0.2 | 14.6 | 21.3 | 87.3 | 0.362 | 0.1 | −1 | |
| Comparative Example 6 | I | 0.2 | 12.8 | 13.5 | 88.1 | 0.336 | 0.1 | −0.5 | |
| Comparative Example 7 | J | 0.2 | 8.8 | 21.5 | 89 | 0.342 | 0 | 0 | |
| Exemplary Embodiment 7 | K | 0.2 | 7.6 | 13.8 | 91.5 | 0.285 | 0.2 | 0.6 | |
| Exemplary Embodiment 8 | L | 0.2 | 8 | 13.7 | 91.2 | 0.276 | 0.2 | 0.8 | |
| Comparative Example 8 | M | 0.2 | 18.6 | 23.6 | 87.2 | 0.442 | 0.1 | −1 | |
| Comparative Example 9 | N | 0.2 | 17.5 | 14.7 | 88 | 0.435 | 0.1 | −0.5 | |
| Comparative Example 10 | O | 0.2 | 9.7 | 21.3 | 88.6 | 0.421 | 0 | 0 | |
| Exemplary Embodiment 9 | P | 0.2 | 9.4 | 13.8 | 90.5 | 0.335 | 0.2 | 0.5 | |
| Exemplary Embodiment 10 | Q | 0.2 | 9.6 | 14.5 | 90.4 | 0.346 | 0.1 | 0.5 | |

It is obvious from Table 7 that Exemplary Embodiments 1 to 10, having all of the thickness of the magnetic layer, dispersion of long-axis length and dispersion of short-axis length within the ranges specified by the present invention, showed desirable static magnetic characteristics, and consequently showed good results both in the output characteristic and C/N characteristic.

On the contrary, it was found that Comparative Examples, having all of these specifications out of the ranges specified by the present invention, showed only a poor dispersibility, and failed in satisfying desirable levels for both of the output characteristic and C/N characteristic.

Thus-obtained, double-layered coated magnetic recording medium showed a high electromagnetic conversion characteristics.

Under circumstances of high recording density and short recording wavelength, thickness of the magnetic layer larger than, for example, ¼ of recording wavelength will result in noise generation, although this will not be a matter of great problem under circumstances of lower recording density.

The present invention adopts a thickness of the magnetic layer of 0.2 μm or less.

As has been described in the above, the present invention is successful in readily providing a magnetic recording medium preferable in electromagnetic conversion characteristics, in particular in C/N characteristic, and suitable for high-density recording.

Finally, the embodiments and examples described above are only examples of the present invention. It should be noted that the present invention is not restricted only to such embodiments and examples, and various modifications, combinations and sub-combinations in accordance with its design or the like may be made without departing from the scope of the present invention.

What is claimed is:

1. A magnetic recording medium comprising:
 a multilayer-coating-type magnetic recording medium having a non-magnetic layer mainly composed of a non-magnetic powder and binder, and a magnetic layer mainly composed of a ferromagnetic powder and a binder, which are stacked in this order on a non-magnetic substrate,
 wherein dispersion σL/L of long-axis length of all ferromagnetic powder particles contained in said magnetic layer falls in a range of σL/L≦±10%, where L is an average long-axis length and σL is a standard deviation thereof,
 dispersion σW/W of short-axis length of all ferromagnetic powders contained in said magnetic layer falls in a range of σW/W≦±15%, where W is an average short-axis length and σW is a standard deviation thereof, and
 a thickness of said magnetic layer is 0.2 μm or less.

2. The magnetic recording medium according to claim 1, wherein said average long-axis length L of said ferromagnetic powder particles falls in a range of 0.08 μm, and 0.12 μm, both ends inclusive, and
 a switching field distribution (SFD) of said multilayer-coating-type magnetic recording medium fabricated with said ferromagnetic powder is 0.25 or less.

3. The magnetic recording medium according to claim 1, wherein said average long-axis length L of said ferromagnetic powder particles falls in a range of 0.06 μm and 0.08 μm, only the lower end inclusive, and a switching field distribution (SFD) of said multilayer-coating-type magnetic recording medium fabricated with said ferromagnetic powder is 0.30 or less.

4. The magnetic recording medium according to claim 1, wherein said average long-axis length L of said ferromagnetic powder particles falls in a range of 0.02 μm and 0.06 μm, only the lower end inclusive, and a switching field distribution (SFD) of said multilayer-coating-type magnetic recording medium fabricated with said ferromagnetic powder is 0.40 or less.

* * * * *